(12) United States Patent
Abe et al.

(10) Patent No.: US 6,827,261 B2
(45) Date of Patent: Dec. 7, 2004

(54) PREPAID CARD CASHING PURCHASING AND TOKEN PURCHASING DEVICE

(75) Inventors: Hiroshi Abe, Iwatsuki (JP); Masaru Miyaji, Iwatsuki (JP)

(73) Assignee: Asahi Seiko Co., Ltd., Tokyo (JP)

( * ) Notice: Subject to any disclaimer, the term of this patent is extended or adjusted under 35 U.S.C. 154(b) by 0 days.

(21) Appl. No.: 10/368,245

(22) Filed: Feb. 18, 2003

(65) Prior Publication Data

US 2004/0159701 A1 Aug. 19, 2004

(51) Int. Cl.[7] .................................................. G06K 5/00
(52) U.S. Cl. ........................................ 235/380; 705/16
(58) Field of Search .................. 235/379–381; 705/16, 35, 41, 43; 379/112

(56) References Cited

U.S. PATENT DOCUMENTS

| | | | |
|---|---|---|---|
| 5,265,874 A | * 11/1993 | Dickinson et al. | 463/25 |
| 5,286,954 A | * 2/1994 | Sato et al. | 235/379 |
| 5,477,038 A | * 12/1995 | Levine et al. | 235/380 |
| 5,577,109 A | * 11/1996 | Stimson et al. | 379/114.2 |
| 5,810,663 A | * 9/1998 | Bochichio et al. | 463/13 |
| 5,984,179 A | * 11/1999 | May | 235/379 |
| 6,345,760 B1 | 2/2002 | Eason et al. | |
| 6,390,269 B1 | * 5/2002 | Billington et al. | 194/217 |
| 6,473,500 B1 | * 10/2002 | Risafi et al. | 379/144.01 |
| 2003/0046249 A1 | * 3/2003 | Wu | 705/79 |

* cited by examiner

Primary Examiner—Thien M. Le
Assistant Examiner—Lisa M. Caputo

(57) ABSTRACT

A cashing device for a prepaid card in a housing which contains a card receiving unit for prepaid cards, a card reading unit to determine the balance on the old prepaid card inserted into the device, a card writing unit to initialize and record the balance on a card, a card handling unit for moving the prepaid card selectively between the various units within the device, a money storage unit and money dispenser for selectively dispensing various denominations from the money storage unit. The device has a display unit with an integrated touch panel keyboard for a user interface. The touch panel keyboard unit issues commands to the control unit which in turn operates the units in the device to refund the balance of a prepaid to the user. The device has a storage area for prepaid cards to recycle the prepaid card after cashing. The device has the capability of returning tokens instead of cash for the balance on a prepaid card. Hence, the device contains a token storage unit and a token dispensing unit. The device has the ability to receive banknotes and dispense a new prepaid card. Hence, the device contains a banknote receiving unit and a new card stack unit. The banknote receiving unit includes a banknote reading unit which is capable of discriminating valid banknote denominations and rejecting fraudulent banknotes. The new card stack unit contains unused cards which may be initialized and a balance recorded thereon.

5 Claims, 6 Drawing Sheets

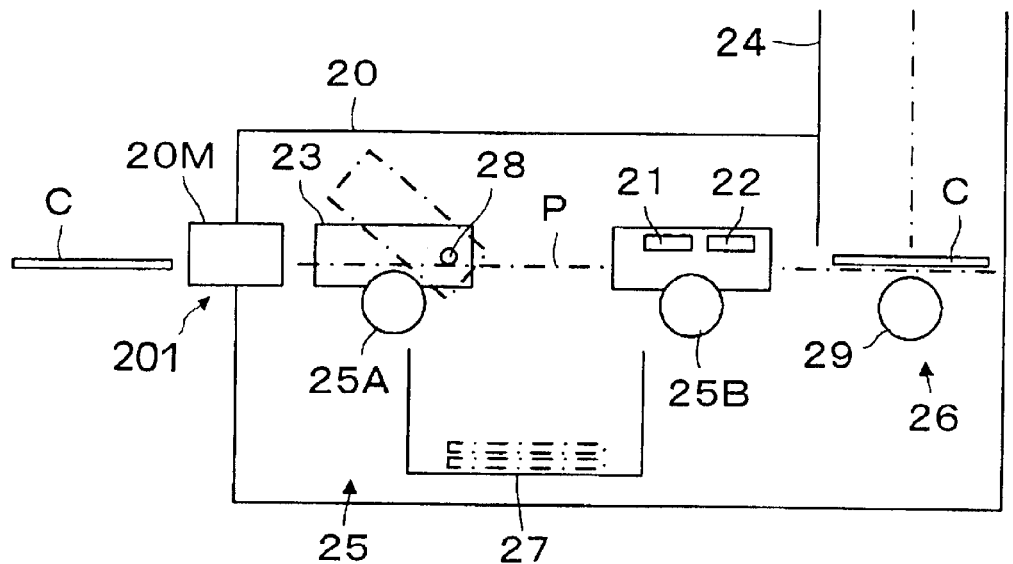

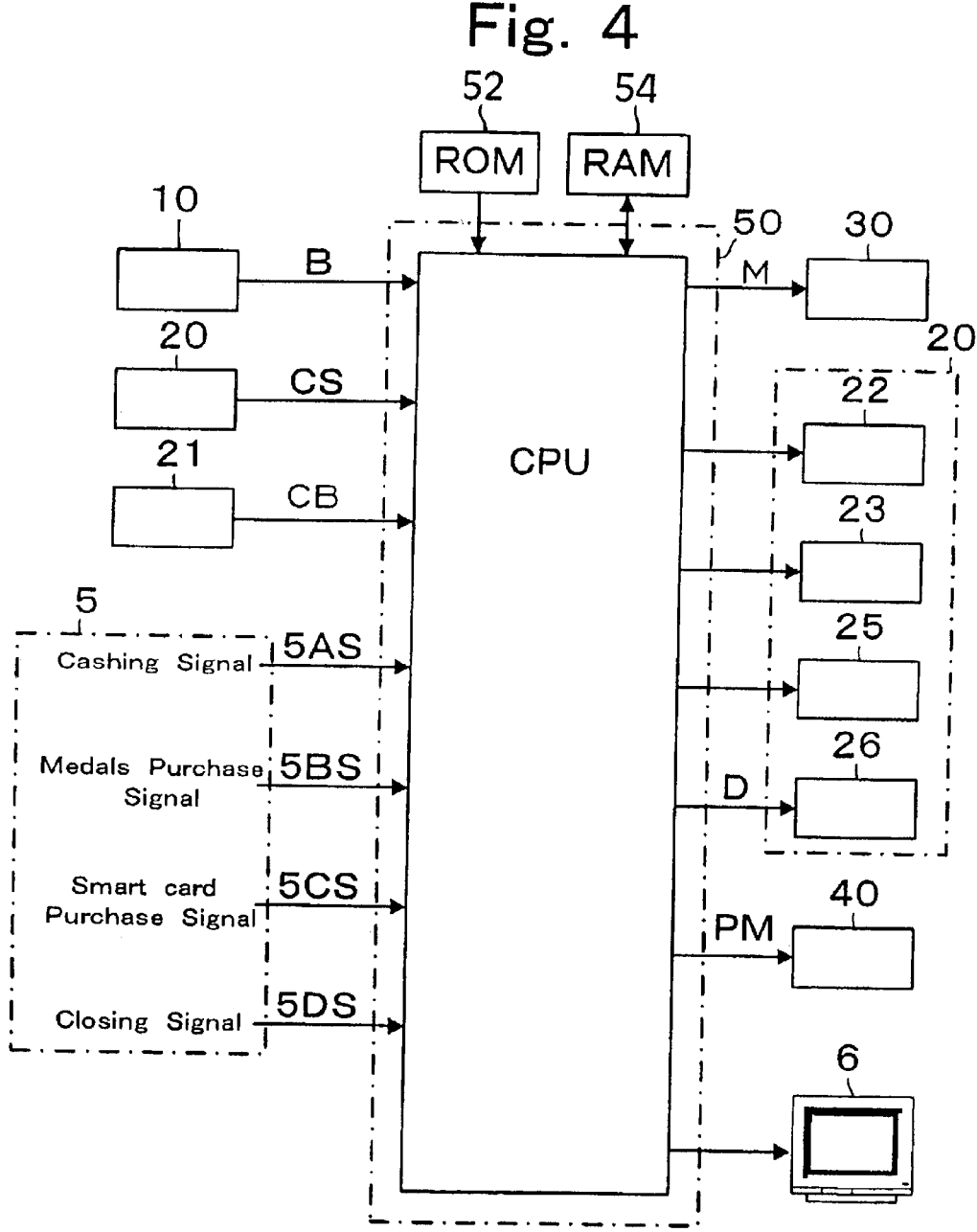

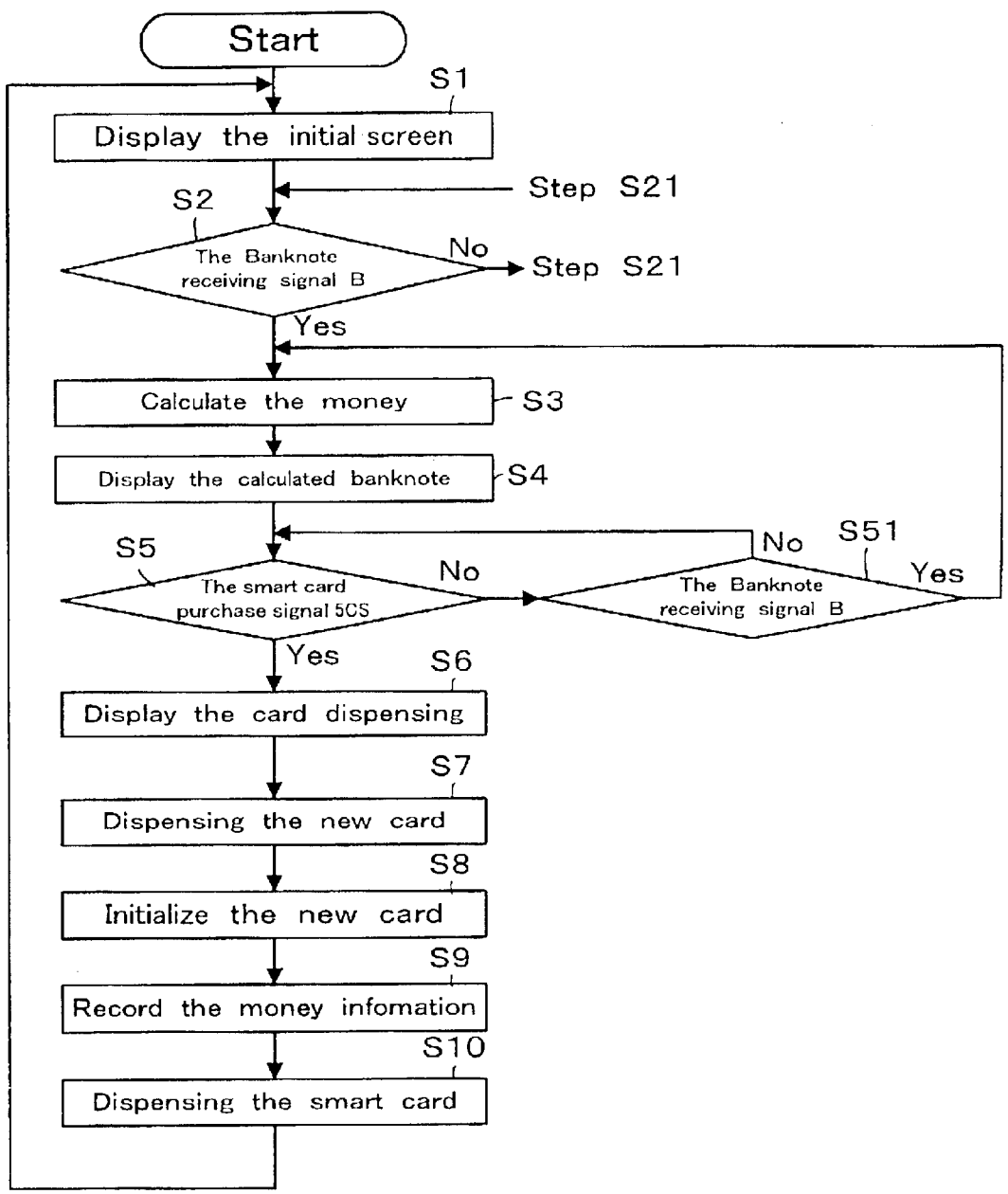

PREPAID CARD CASHING PURCHASING AND TOKEN PURCHASING DEVICE

This application is based on an application number 2001-288173 filed in Japan, the content of which is hereby incorporated by reference.

BACKGROUND OF THE INVENTION

1. Field of the Invention

The present invention relates to a device from which a user can purchase a prepaid card for use in many applications, and more particularly, allow the user to redeem previously purchased prepaid cards and receive cash for the remainder of the prepaid card balance, or to purchase specialized tokens for use instead of cash, while a zero-balance prepaid card is retained by the device.

2. Description of Related Art

Prepaid cards are used in many commercial applications, and machines for dispensing prepaid cards are well know such as in Japanese Laid Open patent application No. 2001-60280 and U.S. Pat. No. 6,345,760. Monetary instruments in the form of coins can be disposed in a coin hopper and its value calculated and electronically written on a prepaid card which is dispensed to the user.

However, after using a prepaid card, a small account balance often remains on the prepaid card in an amount not readily usable in various applications. Previously, there was no cost effective and convenient way to return to the prepaid card owner the balance of the prepaid card. This value was often lost if the card went unused, or was discarded. Thus, the prior art is still seeking a device to enable card owners to receive cash in the amount of the prepaid card balance.

SUMMARY OF THE INVENTION

The present invention is directed to a cashing device for a prepaid card which will allow a user to receive cash for the remainder of a prepaid card balance, to purchase a new prepaid card, or to purchase specialized tokens for use instead of cash. The invention permits a retention of used prepaid cards whose balance is zero so that such cards are removed from circulation and the opportunity for fraud or misuse is reduced.

The present invention provides a housing with a receptor for receiving a prepaid card and which can optionally return the prepaid card to the user. A card reading unit determines a current balance of the inserted prepaid card. There is a receptor for receiving a banknote which can optionally return an invalid banknote to the user. A banknote receiving unit determines the denomination of valid banknotes received.

A display unit with an overlay touch panel keyboard is the user interface. The display shows the current balance of money on the inserted prepaid card and received in the form of banknotes. The touch panel keyboard is used to command a control unit within the device to selectively cash the prepaid card, purchase a new prepaid card, or purchase tokens.

The housing contains a money storage unit and money dispenser for selectively dispensing various denominations from the money storage unit. The device has a storage device for tokens and a token dispenser. Finally, the device has a storage area for prepaid cards to recycle the prepaid card after cashing.

BRIEF DESCRIPTION OF THE DRAWINGS

The exact nature of this invention will be readily apparent from consideration of the following detailed description in conjunction with the accompanying drawings, wherein:

FIG. 2 is an outline view of the cashing device for a prepaid card of the embodiment;

FIG. 3 is a view of the display unit and touch panel keyboard unit of the cashing device for a prepaid card of the embodiment;

FIG. 4 is a block diagram of the cashing device for a prepaid card of the embodiment;

FIGS. 5–7 are a flow chart illustrating the operation of the cashing device for a prepaid card of the embodiment;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein to specifically provide a cashing and purchasing device which can return to the user of a prepaid card, hereinafter simply card, the remaining balance of the card.

The term "prepaid card", "smart card", or "card" in this specification comprehends any easily transportable medium upon which some representation of account balance may be both recorded and read back multiple times such as a card or other framework with a magnetic strip, a card or carrier with an embedded microchip, a smart card, an optically alterable medium, or other forms of identification media which can support the representation of a modifiable account balance.

This device will allow the user to purchase a new prepaid card by depositing one or more banknotes into the device and selecting the desired operation. Further, this device will allow the user of a prepaid card to purchase specialized tokens for use instead of cash in certain applications. After purchasing the selected number of tokens, the remainder of the card balance, if any, will be refunded to the user in the form of a new card.

For the purposes of this specification, a monetary instrument is any medium of exchange such as a banknote or coin. A cashing medium is similar to a monetary instrument but the term cashing medium is more general and comprehends both monetary instruments and tokens.

Figure 1:
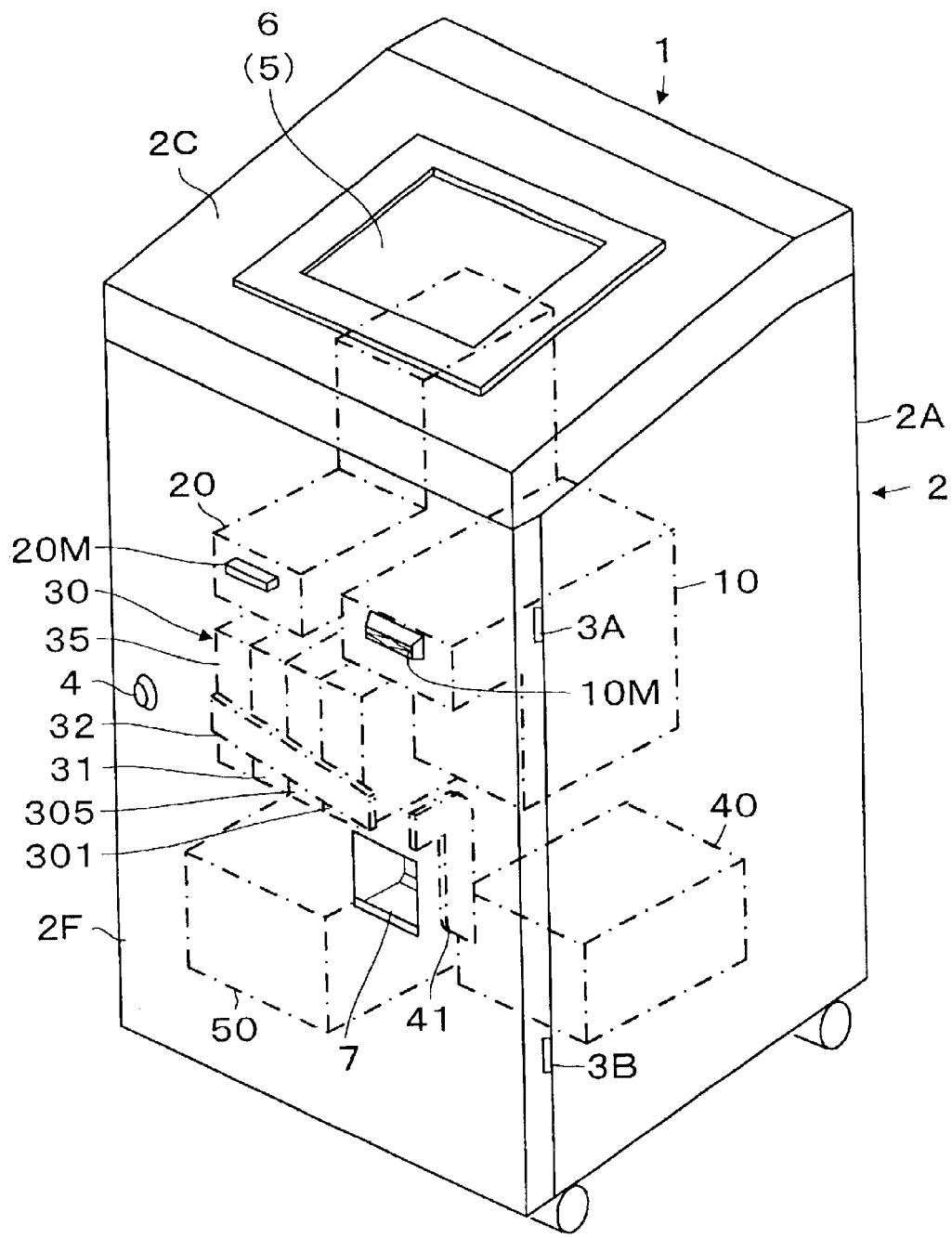
FIG. 1 is a perspective view of the cashing device for a prepaid card of the embodiment.

Referring to the view of FIG. 1, a first embodiment of the present invention is disclosed. The housing 2 of the cashing device is a boxlike enclosure 2A with a door 2F on the front face of the enclosure attached by hinges 3A and 3B. The door 2F is optionally secured by means of a locking mechanism 4.

The user display unit 6 has an overlay touch-sensitive panel keyboard unit 5, and these are mounted in the slanting top face 2C of the housing 2A. The touch-sensitive panel keyboard unit, also called the touch panel unit, is the user input device.

The banknote receptor 10M with an entry slot and the card receptor 20M with a card slot protrude from the door 2F on the same face of the enclosure 2A. The banknote receptor 10M transports the banknote into the housing and may optionally return an invalid banknote to an exterior of the housing of the device.

The banknote receiving unit 10 in the housing includes a banknote reading unit, and is capable of discriminating valid banknote denominations and rejecting fraudulent banknotes.

A banknote is herein defined as any flexible, paper-like monetary instrument which is distinguished from coins or other inflexible monetary instruments.

The monetary instruments storage 30 unit in the housing is composed of dedicated storage units for particular denominations including hopper 35, hopper 31, hopper 305, and hopper 301. These hoppers may hold monetary instruments in the form of coins of various denominations, and they form a part of the monetary instruments dispenser unit 30. The monetary instruments dispenser unit may be composed of a separate dispenser mechanism for each hopper, or the hoppers may together feed a single dispenser mechanism.

The cashing unit 30 is coin dispenser with a dispensing opening 7 which is located at the lower section of the door 2F. The cashing unit 30 dispenses a predetermined number of coins to the dispensing opening 7 through a common coin passageway 32 based on a dispensing signal M. The token dispenser 40 dispenses a predetermined number of tokens to the dispensing opening 7 through a duct 41 based on a dispensing signal PM.

In one embodiment the monetary storage unit hopper 35 is designated for 500 Yen coins, hopper 31 is for 100 Yen coins, hopper 305 is for 50 Yen coins, and hopper 301 is for 10 Yen coins, all located so as to dispense coins into a common coin passageway 32 to arrive at the dispensing opening 7.

In an alternative embodiment, the monetary storage hopper 35 is for 25-cent coins, hopper 31 is for 10-cent coins, hopper 305 is for 5-cent coins, and hopper 301 is for 1-cent coins.

The token dispensing unit 40 in the housing includes a token storage unit. Both the monetary instruments dispensing unit 30 and the token dispensing unit 40 dispense into the dispensing opening 7.

The housing contains a control unit 50 which communicates with the user interface display unit 6 and touch-sensitive panel keyboard unit 5 to operate the units within the device.

The card handling unit 20 in the housing transports the card selectively within the device to and between various units within the housing.

Referring to the view of FIG. 2, the card handling unit 20 is explained. The card handling unit includes a card slot 20M, a card reading unit 21, a card writing unit 22, a card receiving unit 23, a new card stack unit 24, a card receiving and presentation unit 25, a new card dispensing unit 26, and a card recycling storing unit 27. The card receiving unit 23, the card reading unit 21, the card writing unit 22, and the new card dispensing unit are all aligned along a common card passageway P.

The card receptor 20M transports a card selectively into the housing and optionally returns a card to an exterior of the housing.

The card receiving device 23 holds the received card. To recycle a received card, one end of the card receiving device 23 pivots about an axis point 28 approximately 45-degrees from a generally horizontal position to an inclined position, breaking the transport alignment from the passageway P and allowing gravity to draw the received card down into the used card recycling storage unit 27. The card receiving device 23 then pivots in the opposite direction to return to a position of alignment with the passageway P.

The reading unit 21 may read the used card by making contact with the used card, or by a non-contact reading mechanism. Similarly, the writing unit 22 may write to the new card by making contact with the new card, or by a non-contact writing mechanism. Further, the reading unit 21 and writing unit 22 may be combined into a single unit with both capabilities.

The receiving and presentation unit 25 includes rollers 25A and 25B which may rotate in either the forward or reverse direction to move the card in either the forward or reverse direction to transport a card along the in a forward or reverse direction along passageway P.

The forward direction is defined as the direction the card travels in the receiving operation, while the reverse direction is defined as the direction the card travels in the presentation operation. The roller 25A, located below the card receiving device 25, and roller 25B, located below the card reading unit 21 and the card writing unit 22, either or both may be replaced by a drive belt or other mechanism which cause the card to proceed in either the forward or reverse directions as defined above.

New cards are prepared for use by stacking in the card stack unit 24. The new card dispensing unit 26 is located adjacent to and below the card stack unit 24. The new card dispensing unit includes a card transporting device such as a friction roller 29 which may be replaced by a drive belt or other mechanism which causes the new cards to be removed one at a time from the card stack unit 24. Therefore, the card handling unit 20 functions to transport a card C, which is inserted into the card slot 20M, in the forward direction along passageway P to the reading unit 21 in order to read the card balance CB on the card, and then transport the card in the reverse direction along passageway P to the card receiving unit 23, then pivoting the card receiving unit so that the received card will fall under the force of gravity into the recycling card storage unit 27 for recycling.

The card handling unit 20 also functions to transport a card C in the reverse direction along passageway P from the card stack unit 24 to the card writing unit 22 which encodes an amount of money on the card, and then transport the card to the card slot 20M for presentation to the user.

When a card C is inserted in the card slot 20M, the presence of this inserted card is detected by a sensor 201, and the card handling unit outputs a signal CS (FIG.4). Under the direction of the control unit, the rollers 25A and 25B are rotated so as to transport the card in the forward direction to the card reading unit 21 and the writing unit 22 so that information regarding the card balance may be read from and written to the card. After a card C is written to by the card writing unit 22, the card handling unit transports the card in the reverse direction along the passageway P to the card slot 20M for presentation to the user.

Referring to the view of FIGS. 1 and 3, the touch panel unit 5 and display unit 6 are explained. Through the touch panel unit 5, the user can input commands and respond to interrogatories regarding parameters of requested operations. The display 6 is programmable and may show a different configuration of information based on the location of operation of the device, the time of day, the monetary units expected or returned, and other information depending on the version of the program installed in a particular cashing device.

The display shows the status of the cashing device which includes a banknote received money field 61 and a card received money field 6C, along with a monetary unit which may change based on the magnitude of the amount of money received or the card balance. Further, the display can show a guidance field 6G which gives instructions or guidance to the user and may indicate a command or option available to the user.

There are programmable button fields which are used to input commands to the cashing device 1. These button fields are denoted Cash 5A, Medals 5B, Card 5C, and Close 5D. The button Cash 5A is used to command the cashing device to return the balance on the card as cash.

The button Medals 5B is used to command the cashing device to purchase specialized tokens within the parameters of the card balance. An option may be presented to the user allow the user to select the quantity of tokens for purchase. The programmable button fields may then change both in appearance and location to reflect the available quantity options. After the user selects the optional quantity of tokens, the display will revert back to the previous display configuration.

The button Card 5C is used to command the purchase of a new card using the total balance available which includes any banknotes deposited into the cashing device 1 for this purchase.

The Close button 5D is a command to indicate the end of all transactions, and to dispense a new card carrying the current balance, if any.

Referring to the view of FIG. 4, the structure of the control unit 50 is illustrated. The control unit includes a microprocessor, read-only memory ROM 52, and random-access memory RAM 54 which may be written to and read from. The read-only memory may not be altered by the cashing device since it contains the instructions for the control unit 50.

The random-access memory may be altered during the operation of the cashing device since this memory may contain various intermediate data values which are calculated or used in the operation of the cashing device. Either or both of the ROM 52 and RAM 54 may be contained within or physically separate from the structure of the CPU 50 as long as adequate communication between these elements is maintained.

Figure 6:
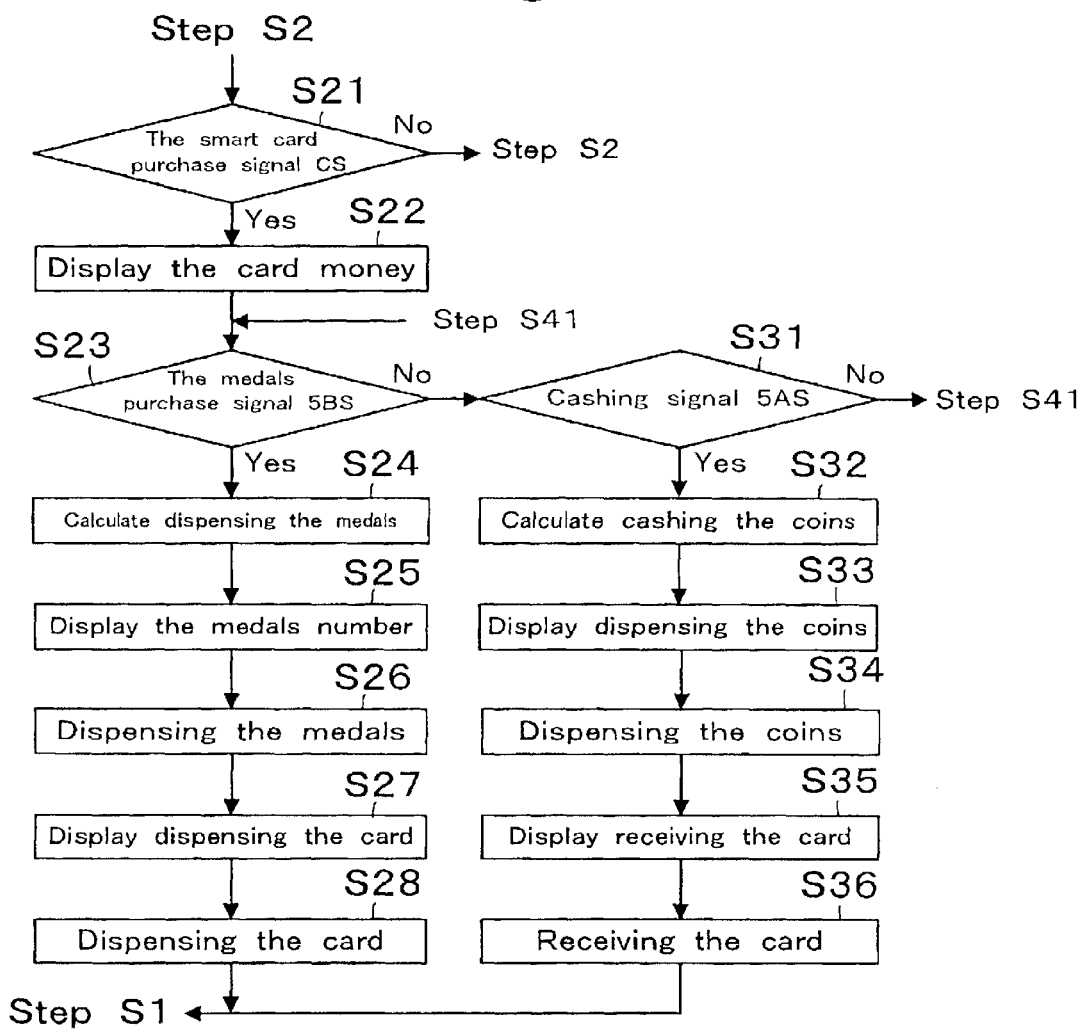
Figure 7:
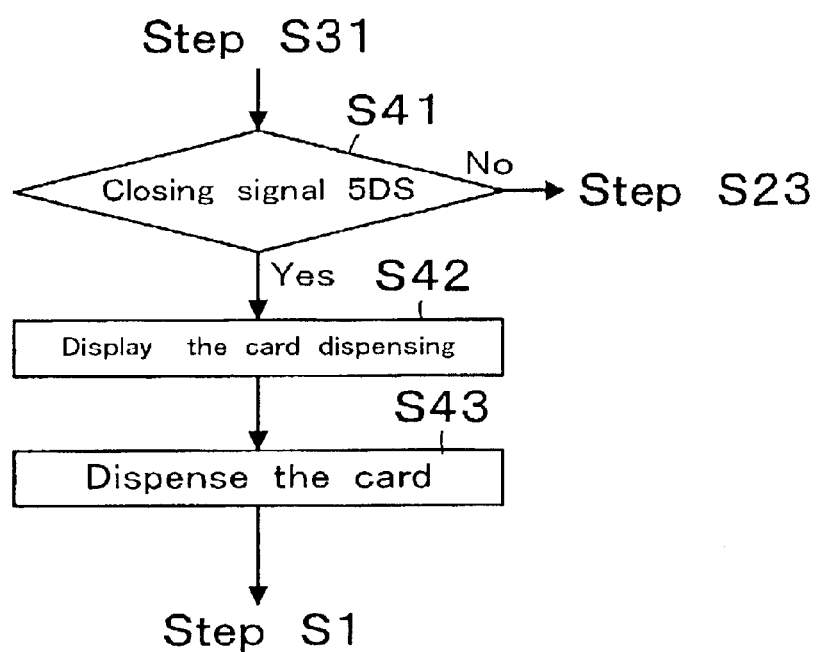

Referring to the views of FIGS. 5–7, the operation of the cashing device is illustrated with flowcharts. After initial application of electrical power, or after initiating a manual reset of the control unit 50, the control passes to step S1 wherein an initial screen configuration is shown by display 6 and the control passes to step S2.

In step S2, if a banknote has been received by the banknote receiving unit 10 as indicated by signal B, control passes to step S3. Else, if no banknote was received in step S2, control passes to step S21.

In step S21, if a card has been received by the card handling unit 20 as indicated by signal CS, control passes to step S22. Else, if no card has been received in step S21, control passes to step S2. Thus, control will loop through steps S2 and S21 until either a banknote or a card is received.

In step S3, the denomination of the received banknote is detected from the banknote receiving unit 10, and control passes to step S4.

In step S4, the received money field 6I of the display 6 is updated to reflect the amount detected in step S3, and control passes to step S5.

In step S5, if the button Card 5C has been pressed by the user as indicated by signal 5CS, control passes to step S6. Else, if the button Card 5C has not been pressed indicated by the absence of signal 5CS, control passes to step S51.

In step S51, if a banknote has been received by the banknote receiving unit 10 as indicated by signal B, control passes to step S3. Else, if no banknote was received in step S51, control passes to step S5. Thus, control will loop through steps S5 and S51 until either the button Card 5C is pressed or a banknote is received.

In step S6, the signal D is applied to the card dispensing unit 26 enabling the card to dispense one new card from the bottom of the new card stack unit 24 to the card handling unit 20. The display guidance field 6G is updated to indicate a new card is being dispensed and control is passed to step S7.

In step S7, the card handling unit 20 transports the card dispensed from the card dispensing unit 26 in the reverse direction along passageway P until the card reaches the card writing unit 22 and control passes to step S8.

In step S8, the card writing unit 22 initializes the card in preparation for recording an encoding which represents an amount of money and control passes to step S9.

In step S9, the card writing unit 22 records an encoding which represents the amount of money detected by the banknote receiving unit 10 in step S3 and control passes to step S10.

In step S10, the card handling unit 20 transports the card in the reverse direction along passageway P so that the card is transported to the card slot 20M for presentation to the user and control passes to step S1. The presented card protrudes from the card slot 20M a sufficient amount to allow the card to be grasped by the hand of the user and removed from the cashing device. The protruding length is approximately half the length of the card.

In step S22, the card is transported by the card handling unit 20 in the forward direction to the card reading unit 21. The card reading unit determines the card balance CB and the card received money field 6C is updated to reflect the amount of money on the card and control passes to step S23.

In step S23, if the button Medals 5B has been pressed, as indicated by signal 5BS, control passes to step S24. Else, if the button Medals 5B has not been pressed as indicated by the absence of signal 5BS, control passes to step S31.

In step S24, the number of tokens purchased is calculated based on the card received money determined in step S22 and control passes to step S25.

In step S25, a token dispensing signal PM corresponding to the number of tokens purchased is applied to the token dispensing unit 40 and control passes to step 26. The display guidance field 6G is updated to indicate tokens are being purchased.

In step S26, the token dispensing unit 40 dispenses the purchased tokens into the dispensing opening 7 and control passes to step S27.

In step S27, the value of the purchased tokens is subtracted by the control unit from the card money received as calculated in step S22 and a new card money amount is updated to the card received money field 6C. If the new card money amount is zero, control passes to step S35. If the new card money amount is not zero, the card handling unit 20 transports the card to the card writing unit 22. The card writing unit 22 initializes the card in preparation for recording an encoding which represents an amount of money. This new card money amount is then recorded on the card by the card writing unit 22. A message indicating a card is dispensing is displayed in the guidance field 6G and control passes to step S28.

In step S28, the card handling unit 20 transports the card from the card writing unit 22 in the reverse direction to the card slot 20M where the card is presented to the user and control passes to step S1.

In step S31, if the button Cash 5A has been pressed, as indicated by the signal 5AS, control passes to step S32. Else, if the button Cash 5A was not pressed, control passes to step S41.

In step S32, the number of each denomination of coins to be dispensed during the cashing operation is calculated by the control unit 50. The value of the coins dispensed is equal in value to the balance on the prepaid card. The corresponding dispensing signal M is applied to the cashing unit 30 and control passes to step S33.

In step S33, a message indicating the cashing operation is in process is updated to the guidance field 6G and control passes to step S34.

In step S34, the number and denomination of coins calculated in step S32 are dispensed to the dispensing opening 7 and control passes to step S35.

In step S35, a message indicating the card is being recycled is updated to the guidance field 6G and control passes to step S36.

In step S36, the card handling unit transports the card in the reverse direction from the card reading unit 21 to the card receiving unit 23. The card receiving unit pivots about the axis point 28 to allow gravity to draw the card down into the used card recycling storage device 27 and control passes to step S1.

In step S41, if the button Close 5D has been pressed, as indicated by the signal 5DS, control passes to step S42. Else, if the button Close has not been pressed, control passes to step S23. Thus, control will loop through steps S23, S31, and S41 until one of the buttons Medals 5B, Cash 5A, or Close 5D are pressed.

In step S42, a message stating a card is dispensing is updated to the guidance field 6G and control passes to step S43.

In step S43, the card handling unit 20 transports the received card in the reverse direction from the card reading unit 21 to the card slot 20M where the card is presented to the user and control is passed to step S1.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A cashing device for a prepaid card, comprising:
    a housing having a receptor opening for entering a prepaid card into the housing;
    a banknote receiving unit for moving a banknote selectively into the housing and optionally returning the banknote to an exterior of the housing, the banknote receiving unit being adjacent to the receptor opening for entering a banknote;
    a banknote reading unit which can determine the denomination of a valid banknote and reject an invalid banknote, the banknote reading unit being adjacent to the banknote receiving unit;
    a prepaid card receiving unit for moving a prepaid card selectively into the housing and optionally returning the prepaid card to an exterior of the housing, wherein the prepaid card receiving unit is adjacent to the receptor opening for entering a prepaid card;
    a prepaid card reading unit in the housing for reading the balance on the prepaid card, wherein the prepaid card reading unit is adjacent to the prepaid card receiving unit;
    a monetary instruments storage unit in the housing to store a plurality of monetary instruments of one or more denominations;
    a monetary instrument dispenser unit in the housing, operatively connected to the monetary instruments storage unit for selectively dispensing monetary instruments to a location which is accessible from the exterior of the housing;
    a new prepaid card storage unit in the housing, wherein the prepaid card storage unit can contain a plurality of new prepaid cards;
    a prepaid card dispensing unit, operatively connected to the new prepaid card storage unit for selectively dispensing new prepaid cards one by one;
    a prepaid card writing unit in the housing, wherein the prepaid card writing unit will initialize the prepaid card and write a balance on the prepaid card;
    a card handling unit in the housing for moving the prepaid card between the prepaid card dispensing unit, the prepaid card writing unit, the prepaid card receiving unit, the prepaid card reading unit, the prepaid card receiving unit being operable for presenting a prepaid card to the user;
    a display unit with an overlay touch panel keyboard unit as a user interface on the exterior of the housing, wherein the display unit indicates the balance read by the prepaid card reading unit and the touch panel keyboard unit permits a user to input commands; and
    a control unit in the housing, wherein the control unit receives user commands from the touch panel keyboard unit, sends information to the display unit, operates, the new prepaid card dispensing unit, the prepaid card writing unit, the banknote receiving unit, the banknote reading unit, the card receiving unit, the card reading unit, the card handling unit, and the dispenser unit so that one of monetary instruments, equal in value to the balance on the prepaid card shown on the display unit, are dispensed to the user, and a new prepaid card, with a balance equal to the value of the banknotes received, is dispensed to the user.

2. A cashing device for a prepaid card, as in claim 1, further comprising:
    a recycling storage unit in the housing for storing used prepaid cards, and
    a card handling unit which will move the prepaid card from the prepaid card receiving unit to the prepaid card reading unit and back to the prepaid card receiving unit for transfer into the recycling storage unit,
    wherein the card handling unit can pivot about an axis point to move the prepaid card into the card recycling storage unit.

3. A cashing device for a prepaid card as in claim 1, further comprising:
    a token storage unit in the housing to store a plurality of tokens;
    a token dispenser unit in the housing, operatively connected to the token storage unit for selectively dispensing tokens to a location which is accessible from the exterior of the housing; and
    a control unit in the housing, wherein the control unit receives user commands from the touch panel keyboard unit, sends information to the display unit, operates the card receiving unit, the card reading unit, the card handling unit, and the token dispenser unit so that a quantity of tokens, up to or equal in value to the balance on the prepaid card shown on the display unit, are dispensed to the user.

4. A cashing device for a prepaid card, as in claim 1, wherein:

the housing is secured in a closed position by a locking mechanism.

5. A cashing and token dispensing device for a prepaid card, comprising:

a housing having a receptor opening for entering a prepaid card into the housing;

a banknote receiving unit for moving a banknote selectively into the housing and optionally returning the banknote to an exterior of the housing;

a banknote reading unit which can determine the denomination of a valid banknote and reject an invalid banknote, wherein the banknote reading unit is adjacent to the banknote receiving unit;

a prepaid card receiving unit for moving a prepaid card selectively into an interior of a housing and optionally returning the prepaid card to an exterior of the housing, the prepaid card receiving unit being adjacent to a receptor opening within the housing for receiving the prepaid card;

a prepaid card reading/writing unit within the housing for reading a prepaid card balance on the prepaid card, wherein the prepaid card reading unit is adjacent to the prepaid card receiving unit;

a card handling unit within the housing for moving the prepaid card between the prepaid card receiving unit and the prepaid card reading unit, the card handling unit selectively moves a prepaid card into a recycling storage unit, the card handling unit which can pivot about an axis point which is located at an end of a side of the prepaid card reading/writing unit and to move the prepaid card into the card recycling storage unit;

a new card dispensing unit for moving a new card from a card stack unit, the new card dispensing unit is located opposite the prepaid card reading/writing unit and the new card is transported to the prepaid card receiving unit through the prepaid card reading/writing unit and the card handling unit;

a monetary instruments storage unit within the housing for storing a plurality of monetary instruments of different denominations, the monetary instruments storage unit receive a cashing signal and dispenses a predetermined quantity of monetary instruments;

a token dispensing unit for storing a predetermined number of tokens, the token dispensing unit receives a token dispensing signal and dispenses a predetermined quantity of tokens;

a dispensing opening in the housing for receiving the monetary instruments and the tokens;

a cash button located on an exterior of the housing, the cash button operable to provide a cash button signal;

a medal button located on the exterior of the housing, the medal button operable to provide a token dispensing signal;

a card button located on the exterior of the housing, the card button operable to provide a new card dispensing signal;

a display unit as a user interface located on the exterior of the housing, wherein the display unit indicates the balance read by the prepaid card reading/writing unit; and a control unit within the housing for receiving the prepaid card balance, the cash button signal, the token dispensing signal, and outputting a cashing signal, and outputting a token dispensing signal, wherein when the cash button is operated the monetary instruments storage unit dispenses a predetermined quantity of monetary instruments corresponding to the prepaid card balance and the prepaid card is moved into the recycling storage area by the card handling unit, wherein when the medal button is operated, the token dispensing unit dispenses a predetermined quantity of tokens corresponding to the prepaid card balance and the prepaid card is moved into the recycling storage area by the card handling unit, and wherein when the card button is operated, the new card dispensing unit is operated and transports a new card from the card stack unit to the prepaid card reading/writing unit, the new card is stopped in the prepaid card reading/writing unit and has stored monetary instruments quantity corresponding to the determined denomination of the banknote reading unit.

* * * * *